No. 829,307. PATENTED AUG. 21, 1906.
G. WEINBEER.
TURNER FOR GREEN MALT.
APPLICATION FILED FEB. 15, 1906.

2 SHEETS—SHEET 1.

Witnesses:
N. Reynolds
M. Taylor.

Inventor:
Gregor Weinbeer
by George T. Massie
Attorney

No. 829,307. PATENTED AUG. 21, 1906.
G. WEINBEER.
TURNER FOR GREEN MALT.
APPLICATION FILED FEB. 15, 1906.
2 SHEETS—SHEET 2.
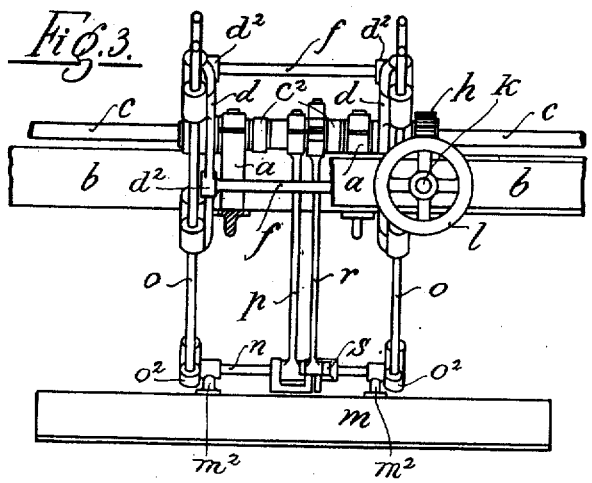
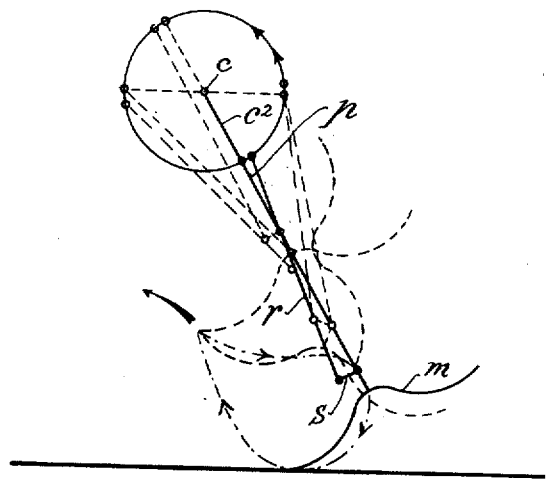
Witnesses:
N. Reynolds.
M. Taylor.
Inventor:
Gregor Weinbeer
by George Massie
Attorney

UNITED STATES PATENT OFFICE.

GREGOR WEINBEER, OF NUREMBERG, GERMANY.

TURNER FOR GREEN MALT.

No. 829,307. Specification of Letters Patent. Patented Aug. 21, 1906.

Application filed February 15, 1906. Serial No. 301,289.

*To all whom it may concern:*

Be it known that I, GREGOR WEINBEER, a subject of the German Emperor, residing at Nuremberg, Bavaria, Germany, have invented certain new and useful Improvements in Turners for Green Malt; and I do hereby declare the following to be a full, clear, and exact description of the invention, such as will enable others skilled in the art to which it appertains to make and use the same.

This invention has for its object a green-malt turner having shovels or scoops guided in a straight line and set in oscillation by means of eccentrics, in which for the purpose of enabling the direction in which the green malt is thrown to be suitably altered the straight guiding arrangement, operating the movement of the shovels or scoops in a straight line, is adapted to be adjusted into any suitable position of inclination by means of a worm-gear or the like. By this means it is possible to suitably alter more particularly the throw for the malt in order to give it a shorter or longer exposure for the absorption of oxygen during its passage through the air.

The invention with one shovel or scoop is shown in the accompanying drawings, in which—

Figure 1:
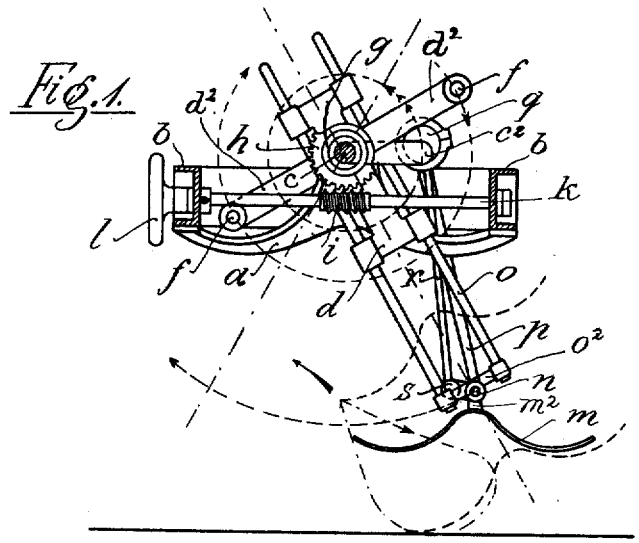
Figure 2:
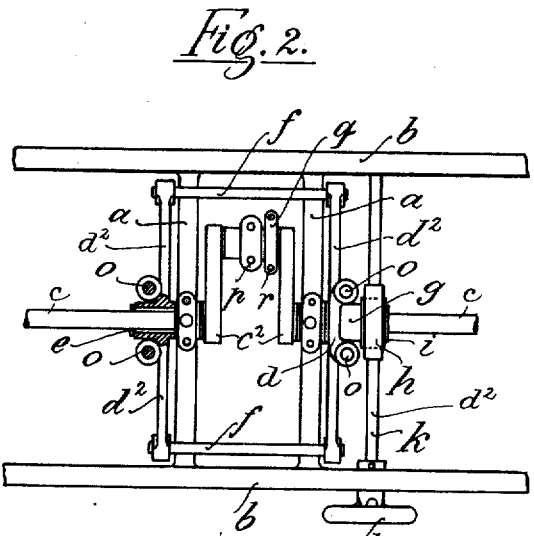

Figure 1 is a side view of the apparatus; Fig. 2, a plan view; Fig. 3, a front view, and Fig. 4 a diagram of the movement of the scoop or shovel.

Bearing-supports $a$ are mounted between the carriers $b$ of the turning apparatus, in which supports $a$ is mounted a two-part shaft $c$, carrying a crank $c^2$. Two guides $d$, revoluble on the shaft $c$, are arranged on the prolonged ends $e$ of the bearings. Each guide is provided with two oppositely-projecting alined arms $d^2$, that are firmly connected with one another by means of cross-bars $f$.

On the hub $g$ of one of the guides $d$ a worm-sector $h$ is mounted, with which a worm $i$ gears, the shaft $k$ of which is mounted in the carriers $b$ and may be turned by a hand-wheel $l$. The lifting element $m$ in the nature of a shovel or scoop is secured to hangers $m^2$, carried by the shaft $n$, which is connected by head-blocks $a^2$ with the four rods or bars $o$. The bars $o$ slide in the guides $d$ when the shaft $n$ is reciprocated by the crank-shaft $c$ and the connecting-rod $p$. An eccentric disk $q$, mounted on the crank-pin of the crank-shaft, also causes, by means of a rod $r$ and lever $s$, a rocking movement of the shovel or scoop $m$ on the shaft $n$. The guides $d$, in which the rods $o$ slide, are adjusted into the desired oblique position by turning a hand-wheel $l$, thus producing a turning of the worm $i$ and the worm-wheel $h$.

The curve shown in Fig. 4, described by the point of the shovel or scoop, enables it to be seen how the malt is taken up in a curve by the shovel and on the reversal of the direction of movement is rapidly thrown off in flatter or steeper direction, according to the inclination of the guides $d$.

Of course by a reversed position of the scoop and opposite direction of rotation of the crank-shaft the turning of the malt may also take place in the opposite direction.

I declare that what I claim is—

1. A malt-turning apparatus embodying a lifting element and means for imparting oscillatory and rectilinear reciprocatory movements thereto.

2. A malt-turning apparatus embodying a lifting element, means for imparting oscillatory and rectilinear reciprocatory movement thereto, and means for changing the inclination of the lifting element to vary the direction of throw of the malt.

3. A malt-turning apparatus embodying a lifting element, means for imparting oscillatory and rectilinear reciprocatory movements thereto, and means for adjusting the lifting element through the arc of a circle whereby to reverse the direction of throw of the malt.

4. A malt-turning apparatus embodying a rectilinear reciprocatory member, a lifting element carried thereby, and means for imparting oscillatory movements to the said element.

5. A malt-turning apparatus embodying a rectilinear reciprocatory member, a lifting element carried thereby, means for imparting oscillatory movements to the said element, and means for changing the inclination of the element to vary the direction of throw of the malt.

6. A malt-turning apparatus embodying a lifting element, a lever operatively connected therewith, an eccentrically-driven rod connected with the lever, to impart oscillatory movements to the lifting element, and means for imparting rectilinear reciprocatory movements to the said element.

7. A malt-turning apparatus embodying a driven crank-shaft, guides loosely mounted on the shaft, rods engaging the guides, a lifting element supported by the rods, and a pair of eccentrics carried by the crank, one of which is operatively connected with the lifting element, and the other with the said rods.

8. A malt-turning apparatus embodying a crank-shaft, guides mounted for oscillatory movement thereon, rods engaging the guides, a lifting element supported by the rods, and means for imparting rectilinear reciprocatory movements to the rods and oscillatory movements to the lifting element.

9. A malt-turning apparatus embodying a support, a crank-shaft journaled thereon, connected guides carried by the crank-shaft, a toothed sector carried by one of the guides, a worm carried by the support and engaging the sector, pairs of rods engaging the guides, head-blocks connecting the pairs of rods, a shaft supported by the head-blocks, a lifting element and a lever carried by the shaft, a pair of eccentrics carried by the crank, a rod connecting one of the eccentrics and the lever to impart oscillatory movement to the lifting element, and a rod connecting the other eccentric and the lever-carrying guide-engaging rods.

In testimony whereof I affix my signature to this specification in the presence of two witnesses.

GREGOR WEINBEER.

Witnesses:
WILHELM HÜNN,
ABRAHAM GÄRTNER